US00RE44238E

(19) United States
(12) Reissued Patent
Cooper et al.

(10) Patent Number: US RE44,238 E
(45) Date of Reissued Patent: May 28, 2013

(54) DEVICE FOR MEASURING PACKAGE SIZE

(75) Inventors: Richard H. Cooper, Kleinburg (CA); Gordon C. Cooper, Etobicoke (CA); Todd Teal, Fort Erie (CA); Lorne Hull, Mississauga (CA)

(73) Assignee: Global Sensor Systems Inc., Ontario (CA)

(21) Appl. No.: 13/374,734

(22) Filed: Jan. 10, 2012

Related U.S. Patent Documents

Reissue of:
(64) Patent No.: 7,373,722
Issued: May 20, 2008
Appl. No.: 11/433,096
Filed: May 12, 2006

(30) Foreign Application Priority Data

Apr. 28, 2006 (CA) ..... 2545118

(51) Int. Cl.
*G01B 11/00* (2006.01)
*G01B 5/00* (2006.01)

(52) U.S. Cl.
USPC ..... 33/1 V; 33/121; 33/706

(58) Field of Classification Search
USPC ..... 33/1 V, 121, 122, 123, 483, 706, 33/707, 293, 296, 478, 832
See application file for complete search history.

(56) References Cited

U.S. PATENT DOCUMENTS

| | | | | | |
|---|---|---|---|---|---|
| 2,149,958 | A * | 3/1939 | Fox | 356/628 |
| 2,688,878 | A * | 9/1954 | Kolisch | 73/865 |
| 2,708,368 | A * | 5/1955 | Kolisch | 73/865 |
| 2,736,095 | A * | 2/1956 | Krauss | 33/1 R |
| 4,268,967 | A * | 5/1981 | Brana et al. | 33/1 V |
| 4,773,029 | A * | 9/1988 | Claesson et al. | 702/167 |
| 4,803,371 | A * | 2/1989 | Durland | 250/559.2 |
| 5,042,015 | A * | 8/1991 | Stringer | 367/99 |
| 5,212,539 | A * | 5/1993 | Wogerbauer | 356/627 |
| 5,331,118 | A * | 7/1994 | Jensen | 177/25.14 |
| 5,528,517 | A * | 6/1996 | Loken | 702/156 |
| 5,734,476 | A * | 3/1998 | Dlugos | 356/628 |
| 5,770,864 | A * | 6/1998 | Dlugos | 250/559.19 |
| 5,777,746 | A * | 7/1998 | Dlugos | 356/628 |
| 5,793,652 | A * | 8/1998 | DeBarber et al. | 702/173 |
| 5,808,912 | A * | 9/1998 | Dlugos et al. | 702/159 |
| 5,815,274 | A * | 9/1998 | Dlugos | 356/634 |
| 5,841,541 | A * | 11/1998 | Dlugos | 356/634 |
| 5,850,370 | A * | 12/1998 | Stringer et al. | 367/128 |
| 5,878,379 | A * | 3/1999 | Dlugos et al. | 702/156 |
| 5,909,013 | A * | 6/1999 | Dlugos | 177/25.11 |
| 5,914,463 | A * | 6/1999 | Dlugos | 177/25.11 |
| 6,189,223 | B1 * | 2/2001 | Haug | 33/1 V |
| 6,373,579 | B1 * | 4/2002 | Ober et al. | 356/627 |
| 6,611,787 | B2 * | 8/2003 | Stringer et al. | 702/159 |
| 6,662,458 | B1 * | 12/2003 | Antonelli | 33/293 |
| 6,850,464 | B2 * | 2/2005 | Carlsruh et al. | 367/99 |
| 7,373,722 | B2 * | 5/2008 | Cooper et al. | 33/1 V |
| 2002/0121025 | A1 * | 9/2002 | Leite | 33/374 |
| 2003/0225712 | A1 * | 12/2003 | Cooper et al. | 705/407 |

* cited by examiner

*Primary Examiner* — Christopher Fulton
(74) *Attorney, Agent, or Firm* — Vidas, Arrett & Steinkraus, P.A.

(57) ABSTRACT

A package measurement apparatus comprising three measurement devices, one for each dimension. Each measurement device comprises a plurality of signal receptor modules. Each module comprises a row of signal receptor, and a signal energy source. In a first calibration step, the outputs of each receptor are standardized to reference maximums and minimums. In a second calibration step, calibration sets of receptor outputs are created and recorded. During measurement, a measurement set of receptor outputs is obtained and matched with a calibration set of receptor outputs to determine the dimension of an object.

32 Claims, 10 Drawing Sheets

Physical Characteristics of the Infrared Transceiver Integrated Arrays
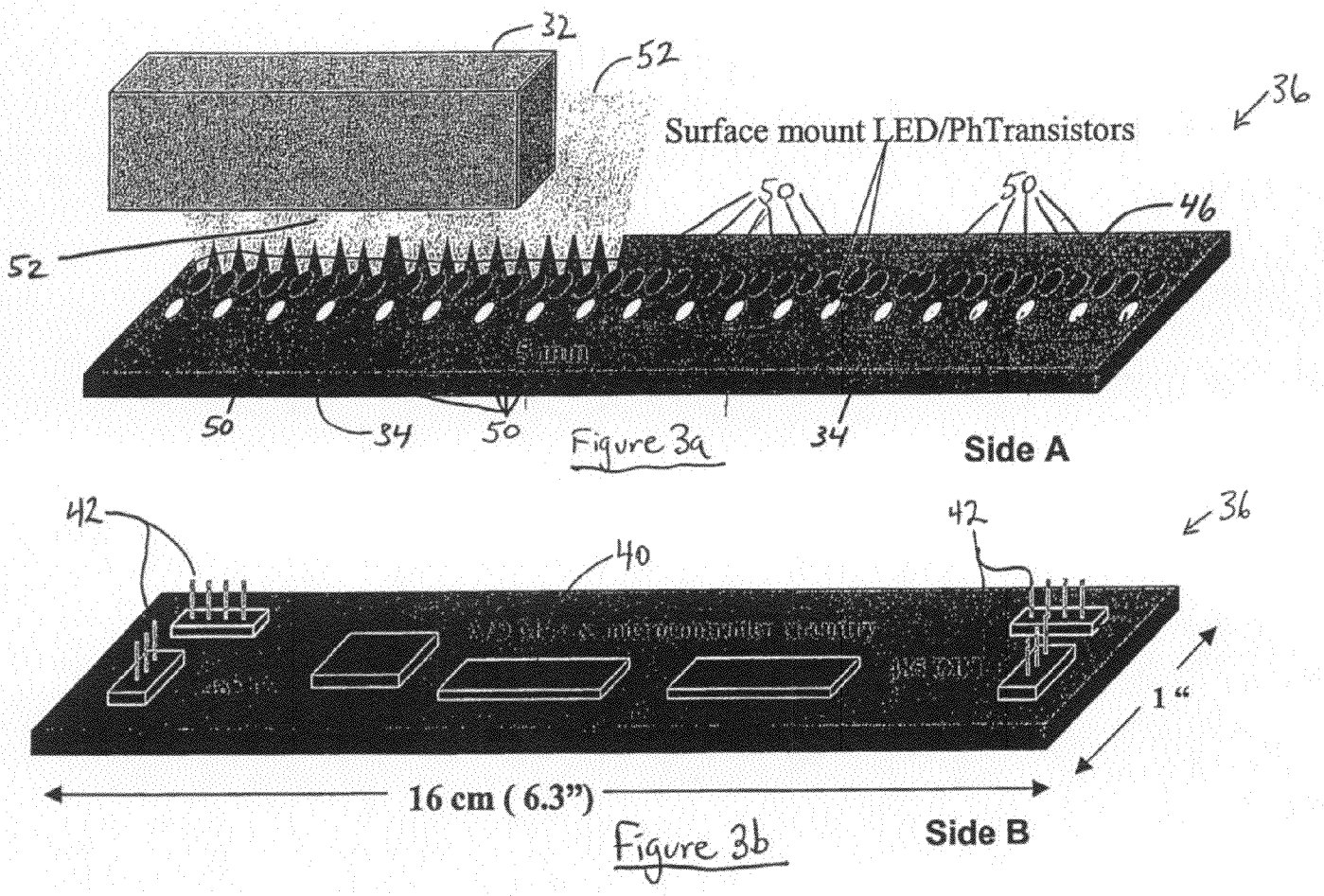

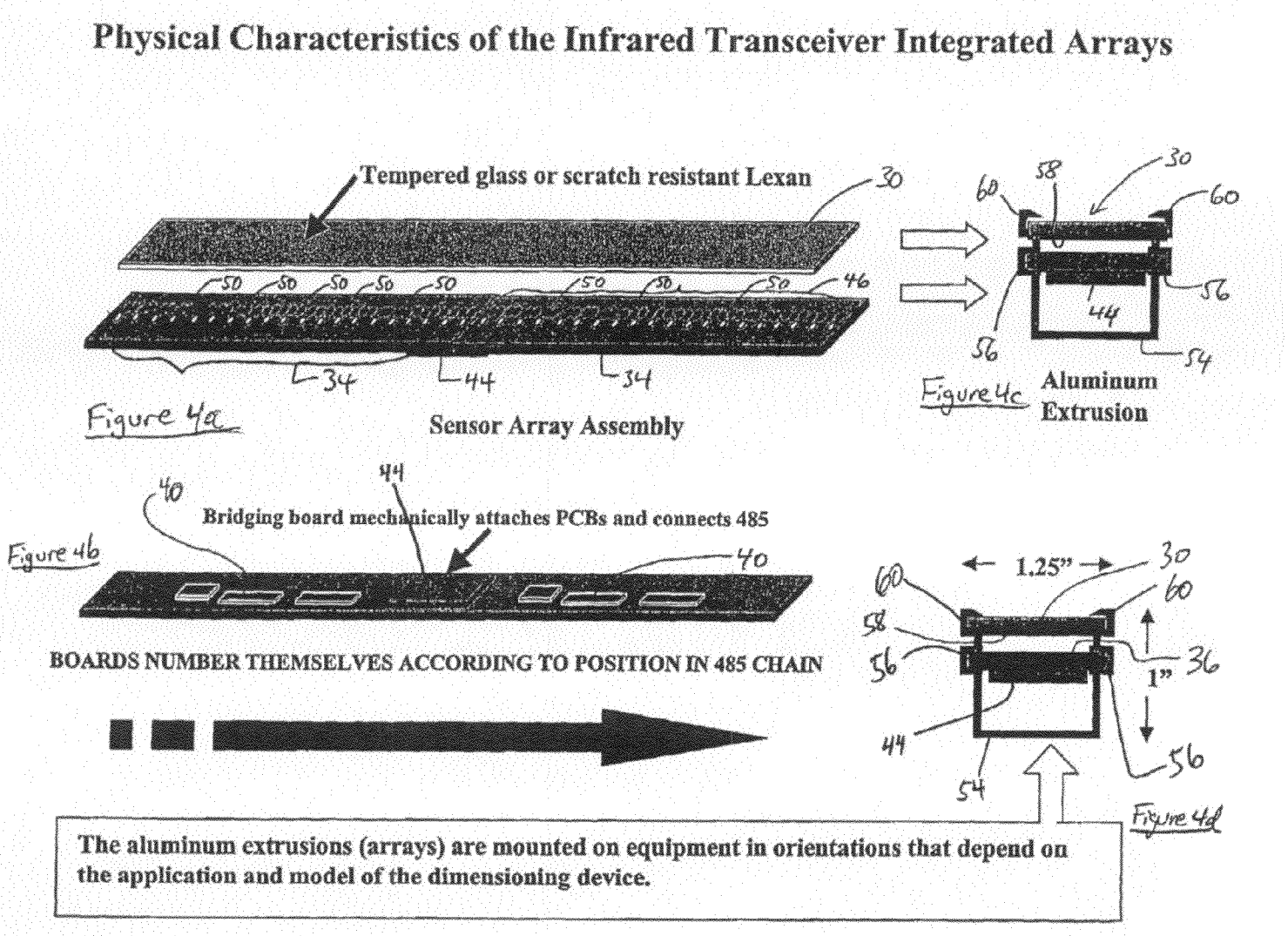
Physical Characteristics of the Infrared Transceiver Integrated Arrays
Tempered glass or scratch resistant Lexan
Sensor Array Assembly
Figure 4a
Figure 4c
Aluminum Extrusion
Bridging board mechanically attaches PCBs and connects 485
Figure 4b
BOARDS NUMBER THEMSELVES ACCORDING TO POSITION IN 485 CHAIN
1.25"
1"
Figure 4d
The aluminum extrusions (arrays) are mounted on equipment in orientations that depend on the application and model of the dimensioning device.

Integrated Transceiver Array
With Staggered Scanning

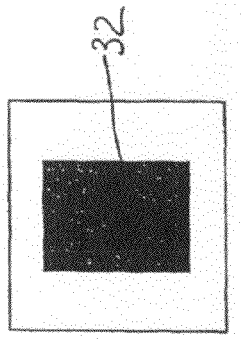
Simulated View of Object through the Split Lens by the Integrated Receptor Array (RA)
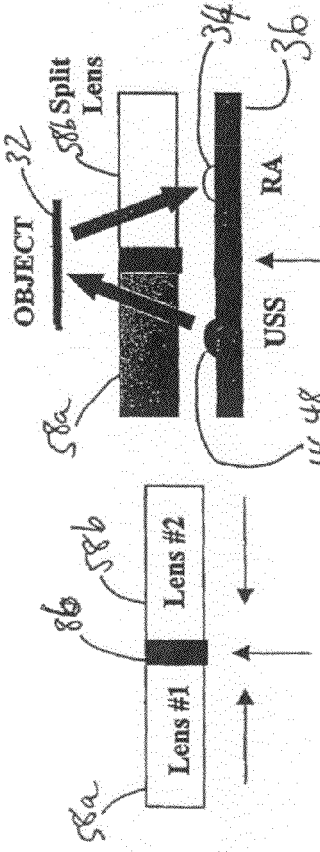
Figure 13
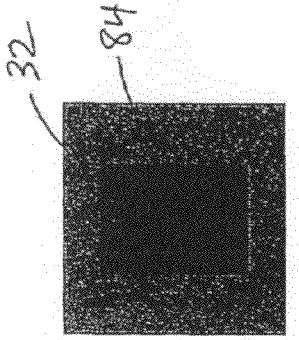
Simulated View of Object through IR 'fog' by the Integrated Receptor Array (RA)
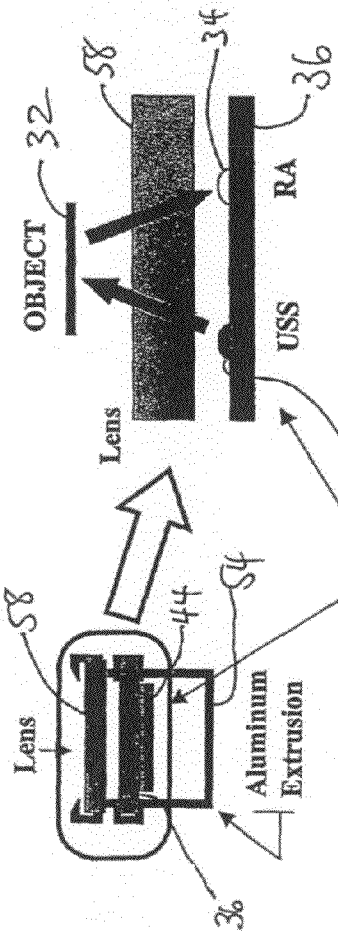
Figure 12

DEVICE FOR MEASURING PACKAGE SIZE

Matter enclosed in heavy brackets [ ] appears in the original patent but forms no part of this reissue specification; matter printed in italics indicates the additions made by reissue.

CROSS-REFERENCE TO RELATED APPLICATIONS

This application claims priority to Canadian Patent Application No. 2,545,118, filed Apr. 28, 2006, the contents of which is hereby incorporated by reference.

FIELD OF THE INVENTION

This invention relates generally to the handling of packages for transport, or of other objects. More particularly, this invention relates to devices and methods used to determine the relevant physical parameters of a package.

BACKGROUND OF THE INVENTION

Many courier companies provide the service of delivering packages on behalf of their customers. In exchange for delivering packages to the customer's specified destination, the courier company charges a fee. Typically, the fee is based upon one or more of (1) the size of package, (2) the weight of the package, (3) the destination of the package, and (4) the time within which the package must be delivered.

A problem exists in determining the appropriate charge for delivering the package. In some cases, the volume of the package is the limiting constraint, especially for goods shipped by overnight carrier. In other circumstances, the package's weight can be the limiting factor. What is needed is a way of measuring such physical parameters of a package to evaluate the appropriate shipping charge for the customer.

For large courier companies, these charges need to be determined for a very large number of packages. Large courier companies typically have central sorting stations. In these sorting stations, packages picked up from customers are processed for delivery to the customer's specified destination. Typically, in such circumstances, packages will be unloaded onto a conveyor belt, and the volume and/or weight of each package will be determined as the package moves along the conveyor belt. The customer is automatically billed later. Such a system is disclosed in published U.S. patent application No. 20030225712.

In other situations, there is a lower volume of packages, and payment for shipping is typically obtained at the time the customer provides the package to be delivered. For example, there are many companies that offer private mailbox services and the like, in a storefront setting. Typically, such companies also offer courier services. A customer enters the store with a package, and the package is sized and/or weighed immediately to determine shipping charges. In such cases, the measuring device used typically requires the user to place the package on a platform for measurement.

U.S. Pat. No. 4,773,029 ("Claesson") discloses a measuring device for measuring three dimensions of an object being carried by a conveyor belt. The height of the object is measured by paired transmitters and receivers that are positioned on opposite sides of the conveyor belt, and are aimed across the conveyor belt. The width of the package is measured by paired transmitters and receivers that are positioned above the conveyor belt, and below the surface of the conveyor belt, between two sections thereof. The length of the device is measured by performing a calculation using the speed of the object on the conveyor belt.

The rows of transmitters and receivers are made up of modules. Thus, if the size of the relevant object is small, fewer modules can be used to create rows of transmitters and receivers. If, however, an object is larger, and more transmitters and receivers are required to measure its dimensions, then a greater number of modules can be used to extend the size of any set of transmitters or receivers.

The transmitters and receivers operate in pairs. Therefore, if a particular receiver is not receiving its signal from the particular transmitter from which it is paired, then the CPU will know that the object being measured is blocking the signal.

The system also has a calibration sequence which is performed after the measurement of each object, in anticipation of the next object. Specifically, the output of each receptor is measured to determine its raw output when it is receiving a signal from its corresponding transmitter, and when it is receiving no signal from its corresponding transmitter. A decision threshold for determining the presence of a signal, based on the raw output of each receiver, is calculated and stored in the computer for use with the next object.

There are a number of problems with this device. First, the necessity of pairing transmitters with receivers creates an unwieldy structure, in which transmitters or receivers must be positioned above the conveyor (thus taking up space and potentially blocking larger objects) and below the conveyor (thus inefficiently requiring a section break in the conveyor right at the measuring device). Also, the fact that each transmitter is positioned on the opposite side of the measuring platform from a corresponding receiver limits the size of the package that can be measured. In addition, the system uses a great deal of computing power, re-calibrating every signal receiver after each object is measured.

U.S. Pat. No. 5,878,379 ("Dlugos") discloses a dimensional weighing apparatus entitled "Coarse Volume Measurement with Interlock". The device includes a scale for weighing a package, together with a measuring frame having three axes. Along each axes are paired signal transmitters and receivers. The signal transmitters and receivers are positioned adjacent to one another, and oriented so that if the side of a package is positioned adjacent to the pair, then the signal from the transmitter will reflect off the package and travel to the receiver.

A substantial problem with the Dlugos device is that it provides only coarse measurements of package size. The device can only achieve limited precision based on the polling of these individual sensor pairs. So coarse are these measurements that the device includes an apparatus for indicating to the user that he requires a more precise measurement, which he is required to do manually.

SUMMARY OF THE INVENTION

Therefore, what is desired is a dimension measuring apparatus that solves or reduces one or more of the problems described above. The dimension measuring device should measure at least one dimension, though most preferably three dimensions are measured. Preferably, the dimension measuring device will provide precise measurements, ease and efficiency of use, adaptability and flexibility.

Therefore, according to the present invention, there is provided an apparatus for measuring at least one dimension of a package, the device comprising:

a dimension measuring device extending along a measurement axis and being sized and shaped to receive a package at a measurement position and a central processor configured to communicate with said dimension measuring device, receive dimension information, and determine said dimension;

the dimension measuring device comprising a plurality of receptor modules detachably connectable to one another;

each receptor module including a plurality of signal receptors spaced along said measurement axis;

the receptor modules being connected in series, with each receptor module being configured such that all of said plurality of receptor modules are in communication with said central processor to facilitate receipt by the central processor of dimension information;

each receptor including a local controller associated therewith.

According to another aspect of the invention, there is provided a method of calibrating a plurality of signal receptors, the method comprising the steps of:

for each receptor, (i) exposing the receptor to a maximum signal;

(ii) measuring the receptor's output from said maximum signal;

(iii) exposing the receptor to a minimum signal;

(iv) measuring the receptor's output from the minimum signal;

(v) determining a mapping function that maps the output from the maximum signal to a predetermined reference maximum and maps the output from the minimum signal to a predetermined reference minimum;

(vi) storing the mapping function for use in multiple measurements.

According to another aspect of the invention, there is provided a receptor module, comprising:

a plurality of signal receptors positioned generally in a row, and a substrate carrying said plurality;

detachable connection means for connecting said receptor module to other receptor modules in series to form a dimension measuring device with signal receptors positioned along a measurement axis;

a local controller, associated with said plurality of receptors.

According to another aspect of the invention, there is provided a method of determining the size of a dimension of an object, the method comprising the steps of:

placing the object at a measurement location associated with a dimension measuring device comprising a line of signal receptors;

actuating a signal source;

obtaining a measurement set of receptor outputs;

accessing stored calibration sets of receptor outputs, wherein each calibration set of receptor outputs is associated with a particular dimension size;

selecting a calibration set of receptor outputs that is closest to the measurement set of receptor outputs;

using the particular dimension size associated with said closest calibration set of receptor outputs, determining the size of a dimension of an object.

According to another aspect of the invention, there is provided a method of calibrating a dimension measuring device that comprises a line of signal receptors, the method comprising:

selecting a group of N adjacent receptors;

positioning at least one calibration object at each of a plurality of positions within an effect area of said N adjacent receptors to simulate measured objects having edges at each of said positions;

actuating a signal source when a calibration object is placed at each position;

reading a calibration set of receptor outputs for each of said positions; storing said calibration sets of outputs for use during object measurement.

BRIEF DESCRIPTION OF THE DRAWINGS

Reference will now be made to drawings, which illustrate, by way of example only, preferred embodiments of the present invention, and in which:

FIGS. 3a and b show the top and bottom sides respectively of a receptor module;

FIGS. 4a, b, c, and d show the connection and mounting of receptor modules;

FIG. 12 shows the effect of energy reflection off of a lens; and

FIG. 13 illustrates the segmented lens.

DETAILED DESCRIPTION OF THE PREFERRED EMBODIMENTS

Figure 1:
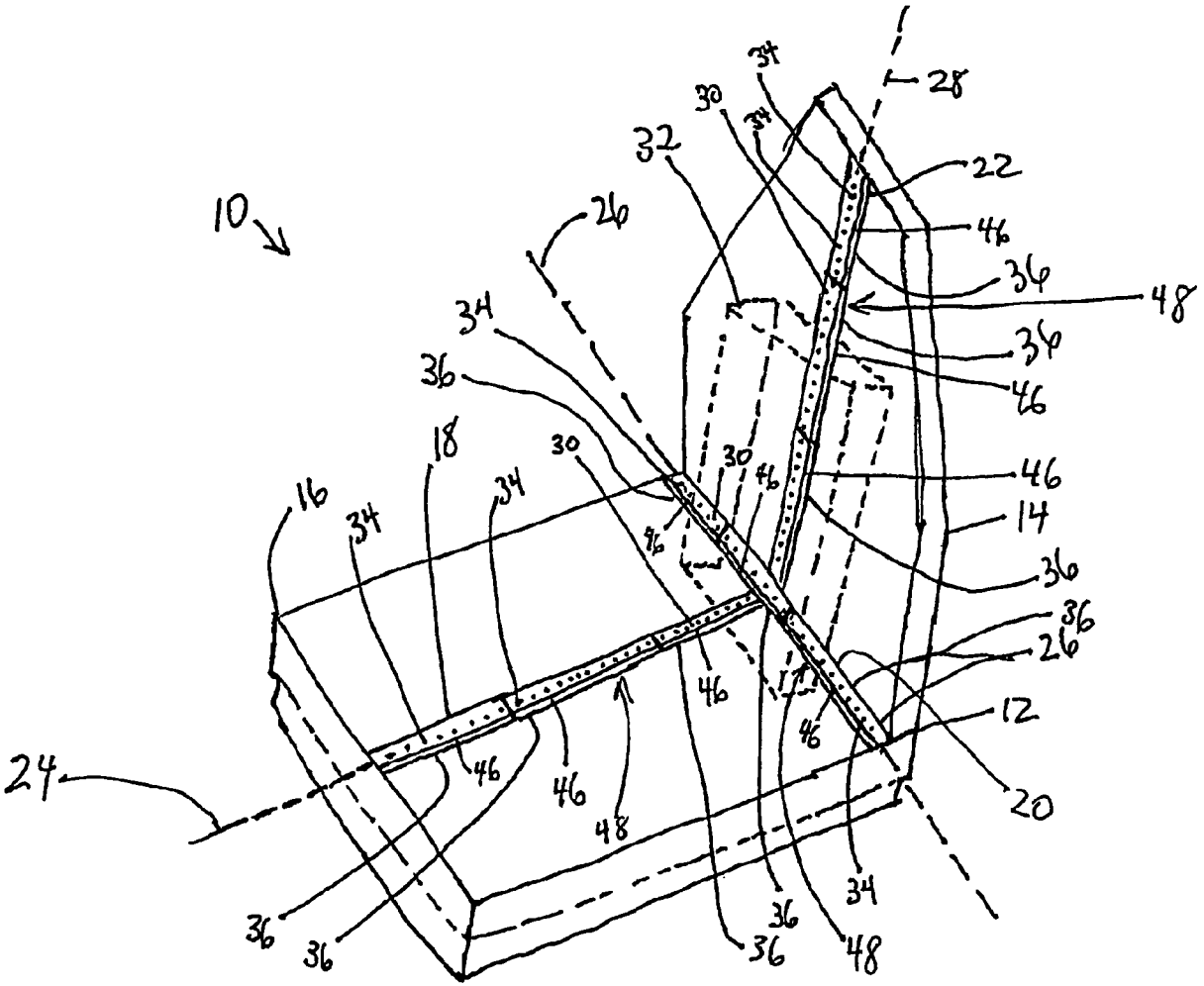
FIG. 1 is a perspective view of a measurement apparatus.

Referring now to FIG. 1, an apparatus 10 is shown for measuring the length, width and height of an object. Preferably, the object comprises a package, and the apparatus 10 is being used to size the package for the purposes of determining the correct charge for shipping or the like. The apparatus 10 shown in FIG. 1 is a stationary apparatus for "cubing" (i.e. measuring the length, width, height of) a package. In other words, the apparatus 10 of FIG. 1 is used by the user placing a package onto the measurement frame 12 of the apparatus 10. The apparatus 10, in the embodiment shown in FIG. 1, does not operate with a conveyor belt.

In the preferred embodiment shown in FIG. 1, the apparatus 10 is configured to measure three dimensions (L, W, H) of a package. It will be appreciated that the invention described herein can be used to measure one or more dimensions of an object.

The measurement frame 12 of the apparatus 10 comprises a generally upstanding back portion 14, and a platform 16. In this preferred embodiment, a package is measured by the package being placed at a measurement position against the back portion 14 and on the platform 16.

It will be appreciated that in many shipping applications, it will be necessary to determine the weight of a package being shipped. Thus, preferably, a weight measuring device (not shown) is positioned beneath the platform 16, so that the platform 16 serves as a platform for the weight measuring device. Thus, when a package is placed in the frame 12, its dimensions are measured, and it is simultaneously weighed.

The apparatus 10 comprises three dimension measuring devices positioned along three measurement axis. The width dimension measuring device 18 is positioned along the width measurement axis 24. The length dimension measuring device 20 extends along the length measurement axis 26. The height dimension measuring device 22 extends along the height measurement axis 28. Preferably, the dimension measuring devices 18, 20, 22 have substantially flat surfaces that are sized and shaped to receive a package adjacent thereto with the package 32 at a measurement position. Thus, as shown in FIG. 1, a package 32 is received adjacent the dimension measuring devices 18, 20 and 22 at a measurement position.

Preferably, each dimension measuring device 18, 20, 22 comprises a line of signal receptors 34 extending along the relevant measurement axis (24, 26 or 28). The size of each dimension of the package 32 is determined by determining the nature of the signal being received by each receptor 34, as will be more particularly described below.

Preferably, each dimension measuring device comprises a plurality of receptor modules 36 detachably connectable to one another. Preferably, each receptor module 36 includes a linear array of energy receptors 34. Preferably, the receptor modules 36 are connected in series, such that the modules 36 form each of the dimension measuring devices, with a line of receptors 34 along each dimension measuring device.

Preferably, each receptor module 36 is configured such that all of the receptor modules are in communication with a central processor 38 (see FIG. 2) of the apparatus 10 to facilitate receipt by the central processor 38 of dimension information from the receptor modules 36. The central processor 38 is preferably configured to communicate with each of the dimension measuring devices 18, 20, 22, to receive dimension information from the dimension measuring devices 24, 26 and 28, and to determine each dimension (length, width, height). In one embodiment, the devices 24, 26 and 28 are communicatively connected to processor 38 via hub 37. Hub cables 39 connect devices 24, 26 and 28 to hub 37, and processor cable 41 connects hub 37 to processor 38. It will be appreciated, however, that other forms of connection between devices 24, 26, 28 and processor 38 are possible, and the form of connection used will depend on a number of factors, including physical and size constraints.

Figure 2:
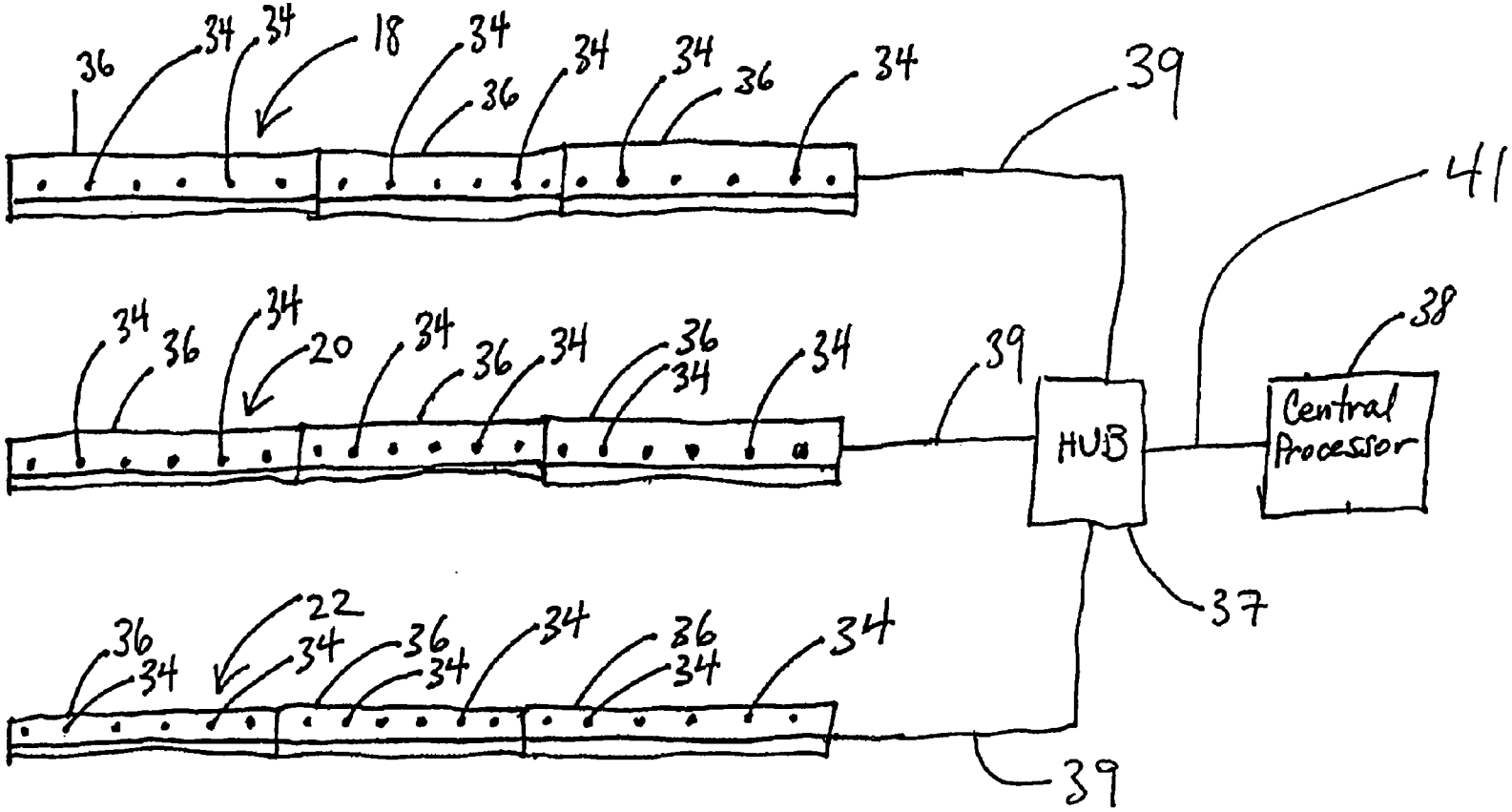
FIG. 2 is a schematic illustration of the apparatus.

Each of the dimension measuring devices 18, 20, 22 is shown in FIGS. 1 and 2 as having three modules 36. It will be appreciated by those skilled in the art that the dimension measuring devices need not have this specific number of modules 36 to be comprehended by the invention. Rather, as will be explained more particularly below, the number of modules 36 is variable, and can be adapted by the user of the apparatus 10 to suit the particular circumstances in which the apparatus 10 is used. Thus, the preferred each device 18, 20, 22 may have as little as one module 36, and any higher number of modules 36. Although much less preferred, the invention further comprehends dimension measuring devices 18, 20, 22 that do not incorporate modules 36 as described herein.

FIG. 2 is a schematic diagram of the dimension measuring devices 18, 20 and 22, and their connection to the central processor 38. As shown in FIG. 2, the modules 36, each including receptors 34, are connected in series. Preferably, each receptor module is configured such that all of the receptor modules 36 in each dimension measuring device are in communication with the central processor 38 to facilitate receipt by the central processor 38 of dimension information. Depending on the position of the particular module 36, that module 36 might communicate with the central processor through other modules 36 that are positioned between it and the central processor 38. Also, each module 36 is preferably configured to permit other modules 36, positioned further away from the central processor 38, to communicate with the central processor 38 through the module 36. In summary, each module is configured to communicate with the central processor 38 through other modules 36, if necessary, and to allow other modules 36 to communicate with the central processor 38 through it, if necessary.

A receptor module 36 is shown schematically at FIGS. 3a and 3b. FIG. 3a shows the top side of each receptor module, while FIG. 3b shows the bottom side. Each module 36 preferably includes a micro-controller 40. In the preferred form of the invention, the micro-controller 40 acts as a local controller for each module 36, controlling a number of functions, including the communication functions of the module 36.

It will be appreciated that, preferably, each module 36 includes a connector 42 at each end for connecting to adjacent modules 36. Extending between each connector 42 and the micro-controller 40 is a communication path, by which signals from adjacent modules 36 travel through the particular module 36. Thus, information from an adjacent module 36 will enter through a connector 42, travel through to the micro-controller 40, continue through another communication path and out through the other connector 42 to the other adjacent module 36. The micro-controller 40 also preferably receives power through the connector 42, in order to power the operation of the micro-controller 40.

The micro-controller 40 is operatively connected to each receptor 34, such that the output from each receptor 34 can be read by the micro-controller 40. It will be appreciated that according to the present invention, the dimensions of the package 32 (or other object) are determined with reference to the output of receptors 34 in response to the signals they are receiving. In the preferred embodiment, the receptors 34 comprise photo-transistors, responsive to light.

Also, in the preferred embodiment, the modules 36 each include a unified energy source 46 thereon. As can be seen in FIG. 1, the unified energy sources 46 are positioned along the dimension measuring devices 18, 20, 22 to form a composite unified energy source 48 for each of the devices 18, 20, 22. The dimensions of the package 32 are determined, generally, by actuating the unified energy source 46, and reading the output of the receptors 34. With the package 32 received against the surfaces 30, light from the unified energy source 46 will bounce off the package and be received by the receptors 34. However, at locations where the package 32 does not reach, there will be no energy reflection off of the package 32, and the output of such receptors 34 will reflect the fact that the energy from the unified energy source 46 is not reflecting off the package onto the receptors 34.

Preferably, the unified energy source comprises a row of infrared LEDs 50, with each of the LEDs 50 being positioned in close proximity to adjacent LEDs 50. The purpose of such close positioning is to cause the unified energy source 46 to deliver a substantially uniform light signal, rather than a punctuated signal with peaks at each LED 50, and valleys between LEDs 50. FIG. 3a shows an example of unified energy source 46 having closely adjacent LEDs 50. Substantially uniform light output 52 is shown. As can be seen, output 52 is substantially uniform as it hits the package 32, without substantial peaks and valleys.

It will be appreciated that having a unified energy source 48 (as opposed to a signal source fluctuating according to position) is preferred, because, with a uniform signal source having substantially uniform output 52, there is a much reduced risk that a particular receptor 36 will be positioned in a dark spot when the source 48 is actuated. Such an occurrence could result in an incorrect determination of the size of the relevant dimension, as it might appear that a package does not extend as far as that particular receptor 36, when in fact, the package does extend that far.

It will be appreciated that the relationship between the number of discrete energy sources (example: LED 50) that form a unified energy source and the number of receptors 34 is variable. For example, there need not be a receptor 34 for each LED 50, and in fact, in the preferred embodiment, there are substantially fewer receptors 34 than LEDs 50. Preferably, the number of discrete energy sources that form the unified energy source is determined by the quantity and configuration required to provide uniform energy coverage 52 for all the receptors in a receptor module (36).

Although the preferred embodiment of the invention includes unified energy sources 48, comprising a row of closely adjacent LEDs 50, it will be appreciated that other methods of measuring dimensions are possible. For example, the energy source could comprise a fluorescent light source, or other types of energy sources such as ultrasonic, radio, radar or other suitable signal or energy type. As another example, the apparatus 10 may include no signal sources at all, and package size may be determined by measuring the differences in ambient light incident upon different receptors 36. Alternatively, signal sources could be mounted not on the modules 34, but rather, apart from the modules 34, so that the package 32, when placed in the frame 12, would block light from said sources from reaching certain receptors 34, thus permitting determination of the dimensions of the package 32. Other possible variations include the use of signals other than light (e.g. ultrasonic signals). Other configurations are also possible. What is important is that receptors 36 are positioned so that differences in the amount of energy reaching different receptors allow the apparatus 10 to determine the dimensions of a package 32. The receptors 34 would need to be compatible with the energy being received. Also, most preferably, the energy level should be consistent (i.e. not flicker or fade).

FIGS. 4a and 4b show how the modules 36 fit together. As shown, adjacent modules 36 connect together in series by means of a bridging board 44 configured to receive connectors 42 from both adjacent modules 36. As can be seen most clearly in FIG. 3b, connectors 42 are arranged such that the module 36 cannot be plugged into the bridging board 44 unless the module 36 is oriented correctly. This prevents improper installation of the modules 36.

FIGS. 4c and 4d show the module holders 54 which hold the modules 36. Preferably, the holders 54 are formed by aluminum extrusion, though other compositions and modes of formation are also comprehended. Preferably, the holders 54 each include two holding slots 56 for receiving the edges of the modules 36 to support them in place. The modules 36 are inserted facing outward, i.e. with the receptors 34 and LEDs 50 facing toward the surfaces 30.

To protect the receptors 34 and LEDs 50, the devices 18, 20, 22 also preferably include lenses 58, adjacent to whose outer surface 30 receives the package 32 is positioned for measurement. The lenses 58 are carried in lens holding slots 60, formed in holder 54, and function to protect the sources 46 and receptors 34 while passing the energy used for measurement.

The lenses 58 are configured to permit the passing therethrough of the signal sensed by the receptors 34. Thus, in the preferred embodiment, the lens 58 are light transmissive (most preferably, transparent and colourless). Also, the lenses 58 are preferably scratch resistant to prevent scratches from interfering with signal transmission.

To install the modules 36, the modules 36 for each device (18, 20, 22) are connected in series using connectors 42 and boards 44. Then, they are inserted into slots 56 from the edge of holder 54, holder 54 being positioned within the frame 12. Then, lens 58 is inserted into slot 60 from the end of holder 54.

It will be appreciated that lenses 58 are typically imperfectly transparent. In other words, some of the infrared light from the LEDs 50 will, instead of passing through the lens 58 and hitting the package 32, reflect off of the lens 58 and hit the module 36. Thus receptors 34 will receive some energy from the source 34 that never reflected off of the package 32, but rather, reflected off of the lens 58. The result is an "energy fog" or "infrared fog" 84 around the receptors 34. FIG. 12 illustrates how the fog 84 is created, and also, how the package 32 appears to the receptors 34 and processor 38 through the fog 84. As can be seen, the contrast between the package and its surrounding is substantially reduced when there is a fog 84, thus rendering it more difficult for the processor 38 to discern the edges of the package 32.

Thus, preferably, for enhanced precision, the apparatus 10 includes a segmented lens 58 for reducing or eliminating fog 84. Segmented lens 58, comprising segments 58a and 58b, is shown in FIG. 13. The lens 58 is divided into two segments by opaque divider 86, which extends along the length of lens 58, and is positioned above and between receptors 34 and source 48 when the lens 58 is installed. The divider 86 is positioned and sized such that energy that is emitted from source 48, that would otherwise have reflected off of lens 58 and been incident upon a receptor 34, instead strikes non-reflective divider 86. The divider is also sized and positioned such that light from source 48 can move past divider 86, strike package 32, and reflect back to receptors 34 by moving past the opposite side of divider 86. Thus, divider 86 reduces or blocks fog 84, while allowing light reflecting off of package 32 to pass, thus permitting object measurement.

It will be appreciated that other configurations are possible to reduce or block fog 84 by blocking energy that has reflected or will reflect from lens 58. What is preferred is that such energy be prevented from creating fog 84 in order to improve the perceptibility of edges of package 32. It will be appreciated, however, that particularly because of the preferred calibration steps described below, the invention comprehends the use of an apparatus 10 that does not reduce or block fog 84.

It will be appreciated that because of manufacturing tolerances, imperfect quality control, and other factors, different receptors may produce different outputs in response to identical inputs. For example, some receptors 34 may produce various non-zero outputs in response to zero input signals. In other cases, the same non-zero input signal may produce different outputs in different receptors 34. Thus, it is useful to calibrate each of the receptors 34 in the apparatus 10 in a first calibration step to address this issue. The purpose of this first calibration step is to ensure that the raw output from each receptor 34 is converted to information that can be validly compared to information received from other receptors 34.

Thus, in the first calibration step, each receptor 34 is exposed to a maximum signal, and its output is measured. Then, the receptor 34 is exposed to a minimum signal (i.e. the minimum signal that the receptor could be expected to receive during operation), and that minimum output is measured. A mapping function is then determined that maps the maximum output and minimum output to a predetermined reference maximum and predetermined reference minimum respectively. These predetermined reference maximums and minimums are constant for all receptors 34. Therefore, once this first calibration step is complete raw dimension information (i.e., in the preferred embodiment, the output signal from the receptor 34) is converted to adjusted dimension information which can be usefully compared with the adjusted dimension information from other receptors 34. At this stage, if two adjusted receptor outputs are equal, then they can be considered to have received the same signal lead.

Figure 5:
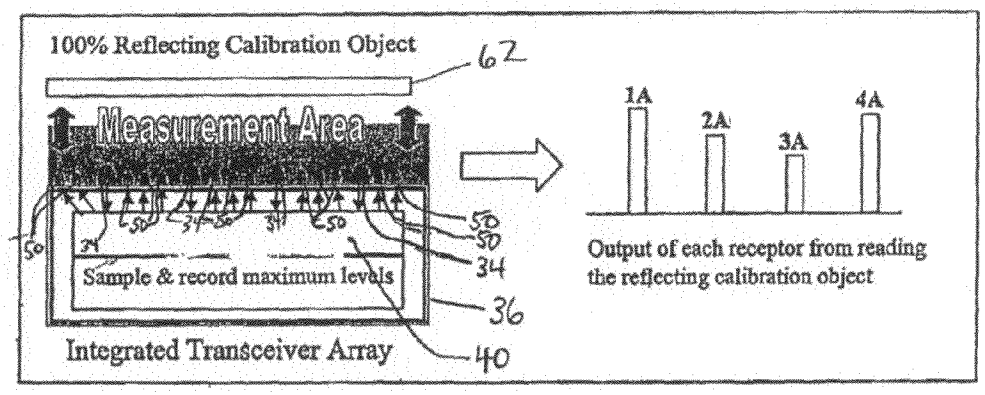
FIG. 5 is a schematic illustration of the initial phase of the first calibration step.
Figure 6:
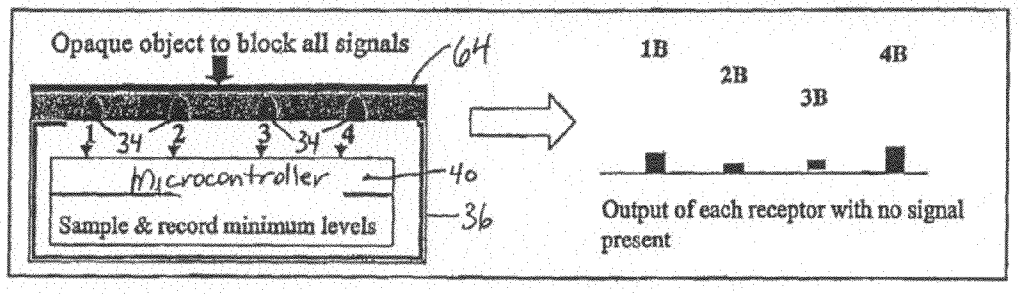
FIG. 6 is a schematic illustration of a next phase of the first calibration step.
Figure 7:
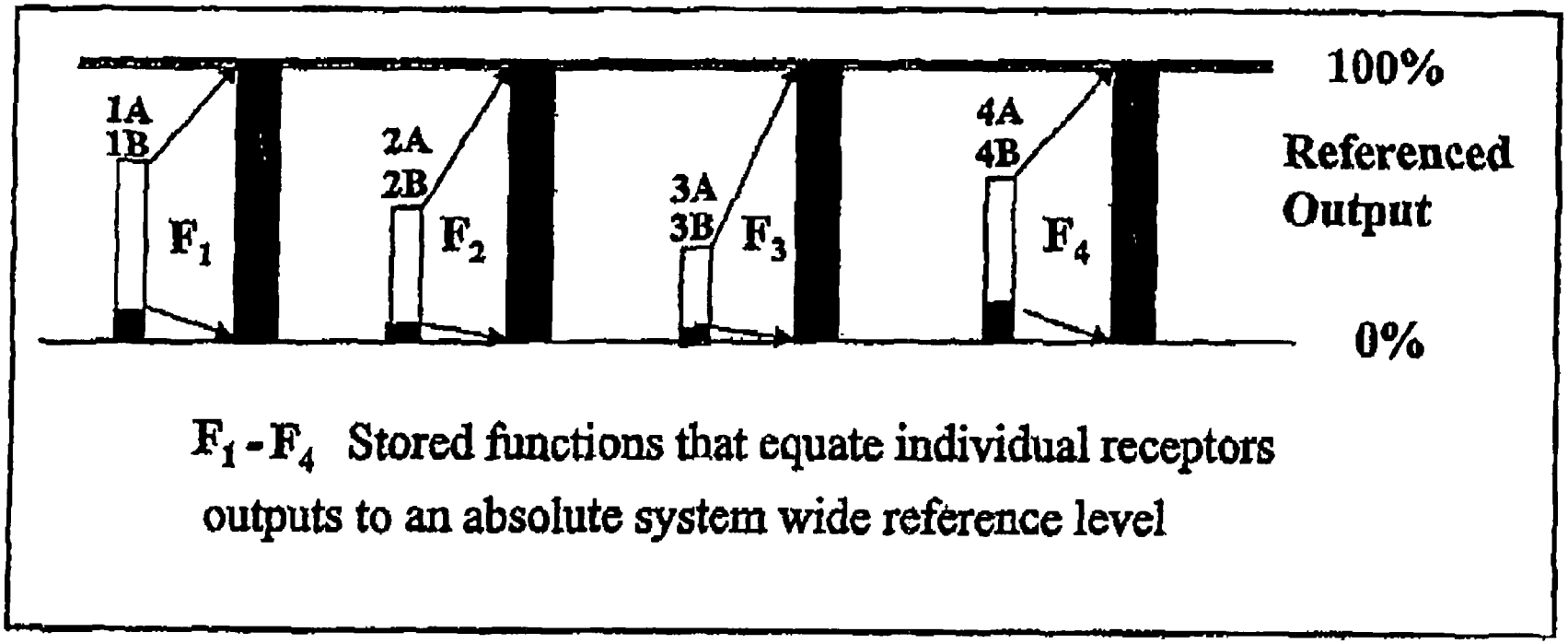
FIG. 7 is a schematic illustration of a subsequent phase of the first calibration step.

For example, a preferred method for the first calibration step is shown in FIGS. 5, 6 and 7. As shown in FIG. 5, in the preferred embodiment, a 100% reflecting calibration object 62 is placed over the receptors 34, and the source 48 is actuated. In the example of FIG. 5, the maximum raw signal output of four receptors 34 is shown. As shown in FIG. 5, these maximum signal outputs are all different from one another. The maximum raw signal levels for each receptor 34 is recorded and stored.

Then, as shown in FIG. 6, an opaque calibration object 64 which reflects no signal, and permits no signals to penetrate from the other side of it, is placed over the receptors 34. This is a minimum signal environment, and, theoretically, the output from each receptor 34 should be zero. However, because of manufacturing tolerances, imperfect quality control and the like, the minimum raw signal output as shown in FIG. 6 are not equal to zero and differ from one another. The minimum raw signal level for each receptor 34 is recorded and stored.

The mapping functions for each of the four receptors 34 are shown in FIG. 7. For each of the four receptors, the maximum signal output is mapped to a predetermined reference maximum, represented by the "100%" reference level shown in FIG. 7. Similarly, each minimum signal output is mapped to a predetermined reference minimum, represented in FIG. 7 by the "0%" reference minimum.

Most preferably, the maximum and minimum raw signal levels for each receptor 34, as well as the mapping function for each receptor 34, are stored in the local controller 40 of the module 36 which contains the particular receptor 34. In this most preferred embodiment, because this calibration information maps the output of each receptor 34 to a predetermined reference maximum that is standard for all modules 36, the module 36 can be used in any apparatus 10 without repeating the first calibration step. Thus, once the calibration step to determine the mapping function for each receptor 34 is complete, and once these mapping functions are stored in the local controller 40, the module 36 can be used in any apparatus 10 without repeating the first calibration step, and can be moved from one apparatus 10 to the other without repeating the first calibration step. This structure provides substantial flexibility to the apparatus 10. If, because of large packages 32, more modules 36 are needed for an apparatus 10, they can be easily added. Similarly, used and/or defective modules 36 can be easily replaced.

It will be appreciated that other modes of storing the calibration information from the first calibration step are comprehended by the invention. For example, the central processor 38 could store the calibration information for each receptor 34. However, such a configuration is much less preferred, because it would tend to limit the flexibility and substitutability of the modules 36.

Preferably, the controllers 40 are programmed to communicate with the processor 38 when installed, or when any modules 36 are added or removed, and to number themselves according to their position along the chain of modules 36 in each of the devices 18, 20, 22. The processor 38 then has address information allowing it to determine where each module 36 is positioned, and thus, where each receptor 34 is positioned.

It will be appreciated that modules 36 are preferably of standard configuration (i.e. they are all preferably substantially identical in structure and function). This results in the modules 36 being interchangeable as described above. Furthermore, in this manner, the processor 38 knows the position of every receptor 34 positioned on any installed module 36. The result is that the dimensions of objects can be precisely measured, as described more particularly below.

Preferably, the modules 36 are configured such that the space between adjacent receptors 34, on the module 36, is constant. The modules 36 are also preferably configured such that when modules 36 are connected in series to form one of the devices 18, 20, 22 having a line of receptors 34, the space between adjacent receptors 34 on the device 18, 20, 22 is constant.

In the preferred form of the invention, the devices 18, 20, 22 are calibrated using a second calibration step. The second calibration step is preferably executed when the modules 36 are connected in series and are connected to the processor 38. In the preferred method of the second calibration step, the information generated by the second calibration step is stored in the memory of the processor 38, in other memory serving the apparatus 10 as a whole, or in memory serving at least one of the devices 18, 20, 22 or as a whole.

Figure 8:
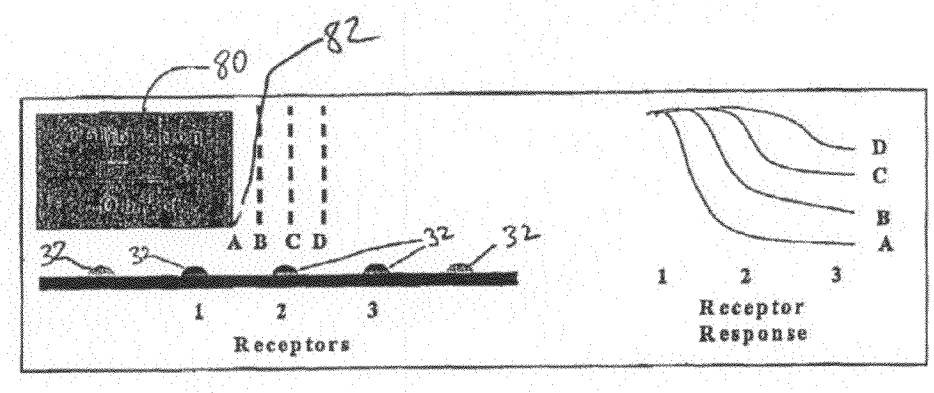
FIG. 8 is a schematic illustration of a second calibration step.

The second calibration step is illustrated schematically at FIG. 8. In the second calibration step, a calibration group of N adjacent receptors is used to generate receptor response information. Theoretically, N may be any integer greater than zero, though the second calibration step is most effective for improving measurement precision and accuracy when N is an integer greater than 1. In the example shown in FIG. 8, N equals 3.

It will be appreciated that, prior to the second calibration step, the outputs from all of the receptors 34 are mapped to a predetermined reference that is constant for all receptors 34 (this was done at the first calibration step). Therefore, any two adjusted receptor responses can be validly compared. If the adjusted outputs of two receptors 34 are the same, then it can be assumed that the two signal inputs received by the two receptors 34 were substantially the same. Similarly, if receptor X's adjusted output was a certain fraction of receptor Y's adjusted output, then it can be assumed that the signal received by receptor X was approximately that same fraction of the signal received by receptor Y, where receptors X and Y can be any two receptors in the devices 18, 20, 22.

In the second calibration step, as shown in FIG. 8, the calibration object 80 is positioned at a plurality of calibration positions in the effect area of the N adjacent receptors (labelled 1, 2, 3 in FIG. 8). For the purposes of this specification, the plurality of calibration positions will be referred to as M calibration positions, where M is an integer greater than 1. In FIG. 8, four of the M positions are indicated by the characters A, B, C, D for the purposes of illustration. The calibration object 80 thus mimics a package 32 having an edge 82 that is positioned at the M positions A, B, C, D, etc. when placed in the measurement position.

"Effect area" means the area along the measurement axis near the N receptors where a small change in the position of edge 82 of object 80 will change the output of one or more of the N adjacent receptors. That effect is shown at the "receptor response" graph of FIG. 8. At position A, receptor 1, which is mostly covered by the object 80, receives energy from the source 48, and shows a high output. Receptors 2 and 3, receiving little or no reflected energy at this position, have low outputs. At position B, the response of receptor 1 remains about the same, but receptors 2 and 3 receive slightly more reflected energy from the source 48, and their outputs are higher. At position C, receptor 2 is now partly covered by the object 80, and its output is therefore higher still. Receptor 3 receives more reflected energy from the source 48 because the object edge is closer to it, and its output is therefore higher. At position D, receptor 2 is now substantially covered by object 80, and has an output almost identical to that of receptor 1. Receptor 3 is now closer to edge 82, receives more reflected energy from source 48, and has a higher output.

It will be appreciated that, most preferably, the first calibration step has been performed prior to this second calibration step. However, through strongly not preferred, the invention contemplates the use of receptors 34 that have not undergone the first calibration step.

Continuing with the second calibration step, the source 48 is actuated to generate a calibration set of receptor outputs for each of the M positions. The calibration set of receptor outputs for each of the N receptors at each of the plurality of positions (for a total of M calibration sets of receptor outputs) is read and stored, preferably in the processor 38. It will be appreciated that because of the first calibration step, the adjusted outputs of all receptors 34 are comparable. Thus, the second calibration step needs only to be performed on a single group of N adjacent receptors in the apparatus 10. The results of this second calibration step can then be applied to all groups of N adjacent receptors 34 on the devices 18, 20, 22.

After the second calibration step is complete, there is stored a total of M calibration sets of receptor outputs, with each set representing one out of the M positions within the effect area of the group of N receptors that was used in the second calibration step. Because the results of the second calibration step are equally applicable to any group of N adjacent receptors, each calibration set of receptor outputs also represents a corresponding one out of the M positions within the effect area of any other group of N adjacent receptors.

The measurement of packages 32 preferably works as follows. An apparatus 10, comprising devices 18, 20 and 22, is provided. The devices 18, 20 and 22 are each comprised of a plurality of modules 36 connected in series and installed in the frame 12. The modules 36 have been calibrated using the preferred first calibration step described above. The mapping functions for each receptor 34, which functions standardize the raw output of receptors 34 to comparable adjusted outputs, are stored on the local controller 40 of the module 36 carrying the relevant receptor.

Once the apparatus 10 is assembled, the preferred second calibration step is performed. A representative group of N adjacent receptors is used for the second calibration step, and the calibration sets of outputs are stored in the processor 38 or other memory used for a device 18, 20, 22 as a whole, or apparatus 10 as a whole. Because receptor outputs were standardized in the first calibration step, the second calibration step only needs to be performed on one set of N adjacent receptors 34, and the results can be applied to all other sets of N adjacent receptors 34 on the apparatus 10.

A package 32 is placed in a measurement position on the frame 12. The source 48 on each device 18, 20, 22 is actuated, and the outputs of each receptor 34 (i.e. raw dimension information) are read and adjusted by the local controllers 40 via the mapping functions for each receptor 34 stored therein. The adjusted receptor outputs (i.e. adjusted dimension information) are sent to the processor 38.

The processor 38 stores, or has access to, the stored receptor response information from the second calibration step, consisting of a calibration set of receptor outputs for the set of N adjacent receptors 34 at each of the calibration positions (e.g. see positions A, B, C, D in FIG. 8). This gives a total of M calibration sets of receptor outputs. The processor 38 reads the adjusted receptor outputs from the modules 36, thus creating a measurement set of receptor outputs (i.e. a set of receptor outputs obtained for measurement). For consecutive groups of N adjacent receptors, the processor 38 observes (i.e. looks at) the measurement set of receptor outputs. The processor 38 tries to match the measurement set of receptor outputs from that group of N adjacent receptors to a calibration set of receptor outputs. If it can't do so, it moves to the next consecutive group of N adjacent receptors. If, in a particular group of N receptors, the measurement set of outputs appears to match one of the calibration set of receptor outputs (i.e. the measurement set of outputs suggests the presence of a package edge), then the closest calibration set of outputs is identified. Each calibration set of outputs is associated with a particular edge position within any group of N adjacent receptors. Using this position, and using its knowledge of which group of N receptors it is observing, the processor 38 determines the size of the dimension of the package 32.

A simplified illustrative example can be used of a device (18, 20 or 22) having six receptors, where N=3. Thus, in this example, there are two consecutive groups of N adjacent receptors 34. When a measurement is taken, the processor 38 looks at the measurement set of receptor outputs for the first N (i.e. 3) receptors, and seeks to match that set to a calibration set of receptor outputs. If a match is found, the processor 38, using its knowledge of which position within the N receptors each calibration set of receptor outputs corresponds to, and in which group of N receptors the match was found, determines the position of the package edge. If no match is available, the processor 38 moves on to the next group of N receptors (receptors 4, 5 and 6) and attempts to match the measurement set of receptor outputs to one of the calibration set of receptor outputs. The same matching attempts take place. Note that, as explained above, the same calibration sets of receptor outputs are used for every group of N adjacent receptors, because receptor outputs were standardized in the first calibration step. By contrast, the measurement set of receptor outputs may be different for each group of N receptors, depending on where the edge of the package is located.

It will be appreciated that the magnitude of outputs in any measurement set of receptor outputs will be affected by factors unrelated to the position of the edge of package 32. For example, a highly reflective package 32 will cause higher receptor outputs adjacent the package 32 than a less reflective package 32. Thus, preferably, the processor 38 is programmed to discern an edge pattern within the measurement set of receptor outputs, even though the specific magnitudes of receptor outputs may vary for different packages 32.

Also, it will be appreciated that in some cases, a feature of a particular package 32 may present the profile of edge even where there is no such edge. For example, a black package bearing a white label might present such a phantom edge profile. Therefore, the processor 38 is preferably programmed with algorithms to recognize phantom edges and filter them out before establishing a measurement of a dimension of the package 32.

It will be appreciated that the precision with which the processor 38 can determine the size of the dimension depends on the number of calibration positions employed in the second calibration step. If there is a calibration position every 1 mm, for example, then the measurement can theoretically be precise to within 0.5 mm when the calibration set of receptor outputs is selected during measurement, though it will be appreciated that other factors can affect precision. Thus, if the distance between calibration positions is greater, measurements will be less precise; if it is smaller, they will be more precise.

Also, the value of N is chosen according to the desired precision, and according to the spacing of receptors 34. In general, given a particular spacing of receptors 34, a greater N will result in a more precise measurement. However, a greater N also requires greater computing power during measurements, and greater storage requirements for calibration data. Therefore, in any particular measurement environment, N can be chosen so as to optimize this trade-off.

Figure 9:
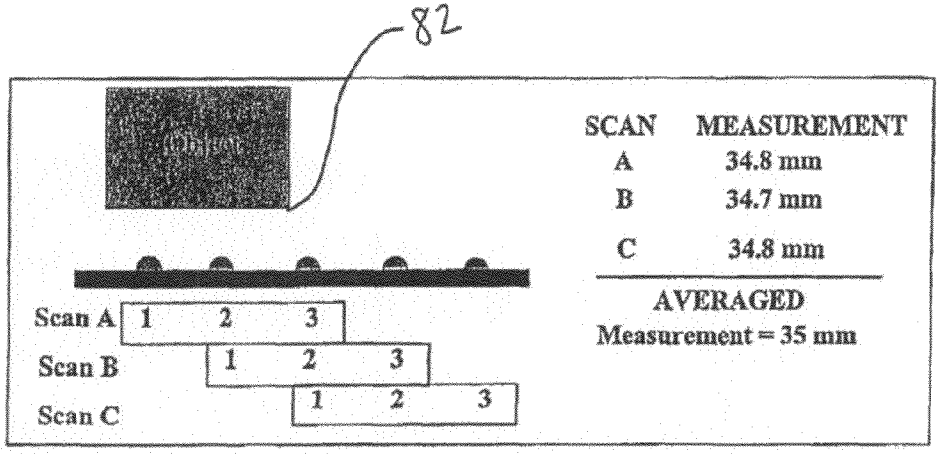
FIG. 9 is a schematic illustration of an alternative measurement method.

FIG. 9 shows an alternative method of measuring the size of the dimension of the package 32. In the preferred measuring method described above, the processor looks at the measurement set of outputs for consecutive (i.e. non-overlapping) groups of N receptors. However, it is also possible for the consecutive groups of N receptors to be overlapping, as shown in FIG. 9. In the example of FIG. 9, N=3, but each successive group of N receptors is offset by only one from the previous group, so that each group overlaps by two receptors. The main result of such a measurement approach is that, as shown in FIG. 9, more that one group of N receptors can provide a match between the measurement set of receptor outputs and a calibration set of receptor outputs. Thus, multiple measurements can be made of the same dimension. Then, the measurements can be averaged to determine a final measurement. This method has the advantage of greater accuracy, in that a single measurement has greater potential for large error due to some unforeseen circumstances than an average of multiple measurements.

The processor 38 may be contained within the frame 12. Alternatively, the processor 38 may be separate, e.g. part of a distinct computer associated with the frame. What is preferred is that the apparatus 10 include a processor 10 to operate the apparatus 10, including calibration, sizing, and shipping charge calculation.

Similarly, it is preferred that the apparatus 10 include a display to display size and shipping charge information. This display may be integral with the frame 12, or consist of a separate computer screen. Other display configurations are also comprehended by the invention.

Figure 10A:
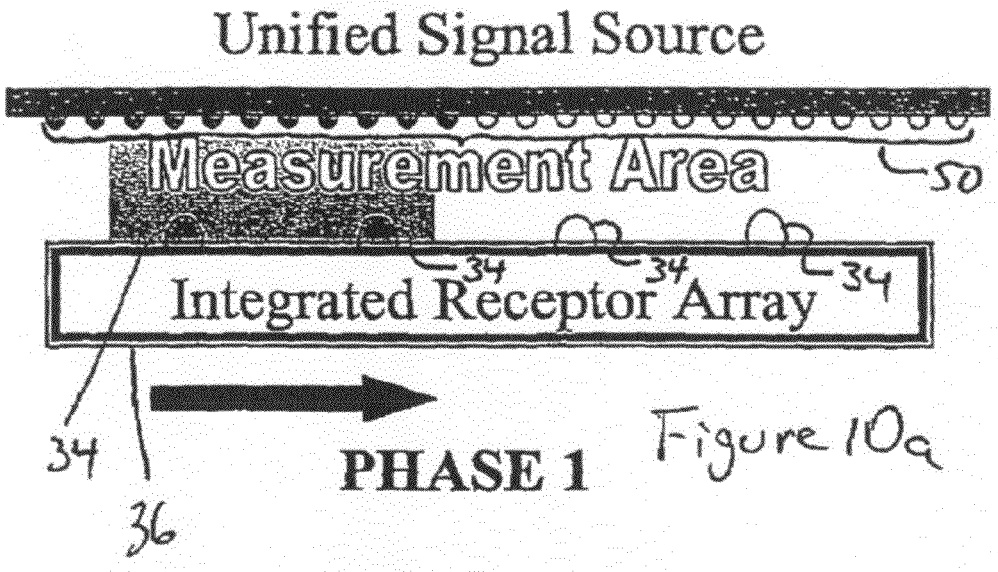
FIGS. 10a, b, and c schematically illustrate actuation of the apparatus by progressive scanning.
Figure 10B:
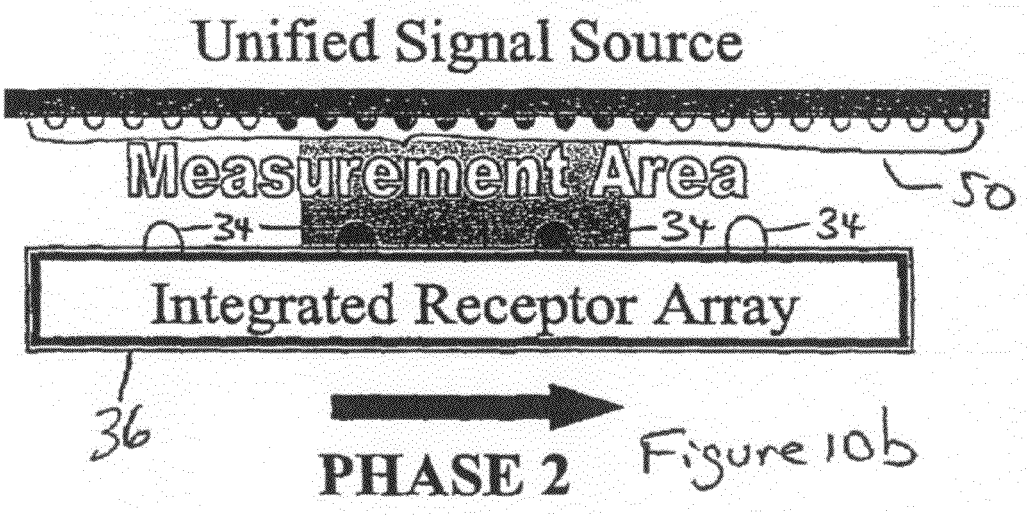
Figure 10C:
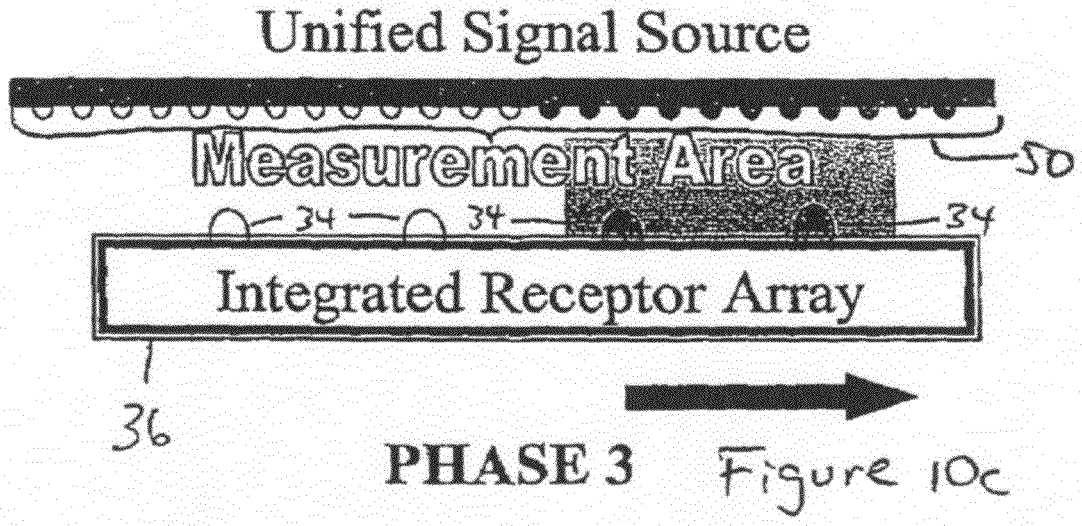

As explained above, the source 48 preferably comprises a line of LEDs 50 in close proximity to one another. For measurement and calibration, the source 48 is actuated, as are the receptors 34. The receptors 34 and source 48 are preferably actuated by progressive scanning (i.e. actuation of receptors and LEDs in succession rather than all at once). The LEDs 50 can be progressively actuated and de-actuated in multi-unit increments (e.g. five at a time), as can the receptors 34. Alternatively, they can be actuated and de-actuated one at a time. What is preferred is that sufficient amounts of signal be present when a particular receptor 34 is actuated to ensure that the receptor 34 receives all of the signal that it is supposed to receive. Progressive scanning is shown at FIGS. 10a-c.

It will be further appreciated, that other modes of actuating the receptors 34 (e.g. turning them all on at once) are also comprehended by the invention.

Progressive scanning provides two main benefits. First, it saves electrical power. As the output from each receptor 34 is read, there is no need to have all of the other receptors turned on, nor is there any need to turn on portions of the source 48 far from the receptor 34 being read. Thus, progressive scanning reduces the amount of energy used during package measurement.

Figure 11:
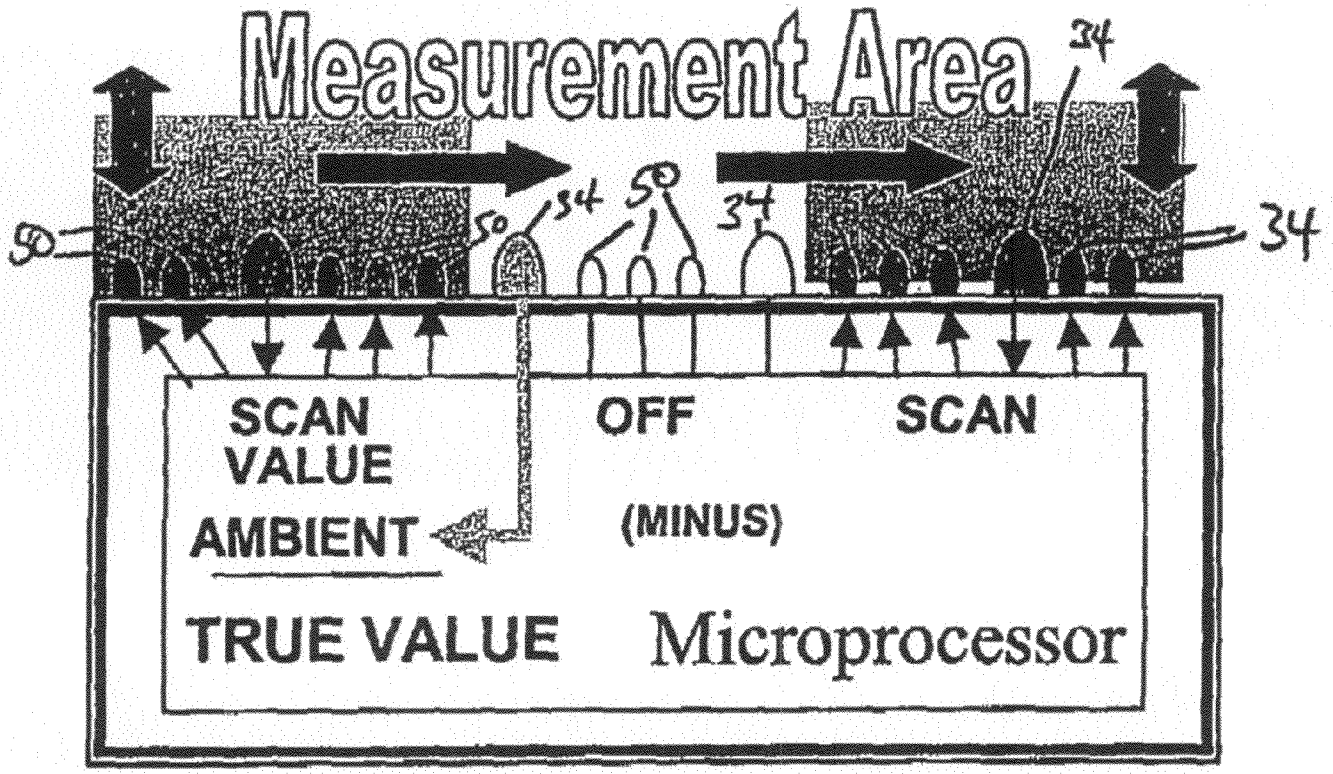
FIG. 11 is a schematic illustration of the exclusion of ambient signal during scanning.

Second, in the preferred embodiment, controllers 40 control both the source 46 and the reading of the receptors 34 (though it will be appreciated that the invention also comprehends the processor 38 controlling these functions). In this preferred embodiment, each receptor 34, during measurement, is actuated and read shortly before the source 48 in the vicinity of the receptor 34 is actuated. The purpose of the early actuation of receptors 34 is to allow a reading to be taken corresponding to the effect of ambient light on each receptor 34. Then, when the source 48 is actuated in the vicinity of the receptor 34, it is read again, and the effect of ambient light is subtracted to provide a true measurement which measures the effect of the source 48 on the receptor and excludes ambient light. This scanning process is illustrated at FIG. 11.

It will be appreciated that other methods could be used to exclude ambient light. For example, the signals from source 48 could be modulated to a particular frequency (say 300 kHz), and receptors 34 could be configured to sense only the modulated signals. Other forms of modulation can also be employed. However, modulation is less preferred at present because of cost and physical board size considerations.

Preferably, the processor is configured to output measurement data in a number of different formats. This includes printer compatible formats, serial data (USB), formats configured for remote and local display, and various network formats (e.g. Ethernet). It will be appreciated that compatibility with many output formats allows the apparatus 10 to be flexibly used in a variety of environments and circumstances.

While the foregoing embodiments of the present invention have been set forth in considerable detail for the purpose of making a complete disclosure of the invention, it will be apparent to those skilled in the art that various modifications can be made to the device without departing from the broad scope of the invention as defined in the attached claims. Some of these variations are discussed above and others will be apparent to those skilled in the art. For example, the signal source herein could take a different form (e.g. ultrasonic), or could be modulated. Also, though strongly not preferred, the first calibration step need not be carried out for the measurement method to be comprehended by the invention. The invention also comprehends the devices 18, 20, 22 not including modules 36. Also, though not preferred, the invention comprehends only one dimension of a package 32 or other object being measured.

The invention claimed is:

1. An apparatus for measuring at least one dimension of a package, the device comprising:

a dimension measuring device extending along a measurement axis and being sized and shaped to receive a package at a measurement position, and a central processor configured to communicate with said dimension measuring device, receive dimension information, and determine said dimension;

the dimension measuring device comprising a plurality of receptor modules detachably connectable to one another;

each receptor module including a plurality of signal receptors spaced along said measurement axis;

the receptor modules being connected in series, with each receptor module being configured such that all of said plurality of receptor modules are in communication with said central processor to facilitate receipt by the central processor of dimension information;

each receptor module including its own local controller associated with the plurality of signal receptors, the local controller containing calibration information for the plurality of signal receptors.

2. The apparatus as claimed in claim 1, wherein each receptor module is configured to be capable of communicating with said central processor through one or more other receptor modules.

3. The apparatus as claimed in claim 2, wherein each receptor module is configured to permit communication between at least one other receptor module and the central processor.

4. The apparatus as claimed in claim 1, wherein the local controller is configured to receive raw dimension information from said plurality of signal receptors, apply said calibration information to said raw dimension information to produce adjusted dimension information, and transmit said adjusted information to said central processor.

5. The apparatus as claimed in claim 1, wherein the calibration information comprises a mapping function mapping the maximum response of each of said plurality of signal receptors to a predetermined reference maximum and mapping the minimum response of each of said plurality of receptors to a predetermined reference minimum.

6. The apparatus as claimed in claim 5, wherein the reference maximum and reference minimum are constant between receptor modules.

7. The apparatus as claimed in claim 6, wherein the local controller is configured to receive raw dimension information from said plurality of signal receptors, apply said calibration information to said raw dimension information to produce adjusted dimension information, and transmit said adjusted dimension information to said central processor.

8. The apparatus as claimed in claim 1, wherein each receptor module is configured such that the space between adjacent receptors on each receptor module is constant.

9. The apparatus as claimed in claim 1 or claim 8, wherein each receptor module is configured such that the space between adjacent signal receptors on the dimension measuring device is constant.

10. The apparatus as claimed in claim 1, wherein the local controller is configured to receive calibration data prior to the receptor module being connected to the dimension measuring device, store said calibration data, and apply said calibration data to the measurement of packages using the dimension measuring device.

11. The apparatus as claimed in claim 1, wherein each receptor module further comprises a signal source.

12. The apparatus as claimed in claim 11, wherein said signal source comprises a uniform signal source.

13. The apparatus as claimed in claim 12, wherein said uniform signal source comprises a plurality of signal points positioned in close proximity to one another to produce a substantially uniform signal over the length of the receptor module.

14. A method of calibrating a plurality of signal receptors, the method comprising the steps of:

for each receptor, (a) exposing the receptor to a maximum signal;

(b) measuring the receptor's output from said maximum signal;

(c) exposing the receptor to a minimum signal;

(d) measuring the receptor's output from the minimum signal;

(e) determining a mapping function that maps the output from the maximum signal to a predetermined reference maximum and maps the output from the minimum signal to a predetermined reference minimum;

(f) storing the mapping function for use in multiple measurements.

15. A method as claimed in claim 14, wherein the storing step comprises storing said mapping function in a local controller associated with the receptor module.

16. A method as claimed in claim 14, wherein the storing step comprises storing the mapping function in a central processor of a dimension measuring apparatus.

17. A receptor module, comprising:

a plurality of signal receptors positioned generally in a row, and a substrate carrying said plurality;

detachable connection means for connecting said receptor module to other receptor modules in series to form a dimension measuring device with signal receptors positioned along a measurement axis;

the receptor module further comprising its own local controller, associated with said plurality of receptors, the local controller being configured to store calibration information for said plurality of signal receptors prior to use.

18. A receptor module as claimed in claim 17, wherein the receptor module is configured to communicate, through at least one other receptor module, with a central processor.

19. A receptor module as claimed in claim 17, wherein the receptor module is configured to permit at least one other receptor module to communicate with a central processor through said receptor module.

20. A receptor module as claimed in claim 17, wherein the space between adjacent signal receptors is constant.

21. A receptor module as claimed in claim 20, wherein the signal receptors are positioned such that when the receptor module is connected in series with other receptor modules to form a dimension measuring device, the space between adjacent signal receptors of the dimension measuring device is constant.

22. A receptor module as claimed in claim 17 wherein said module is configured to be calibrated prior to use and to replace other receptor modules within a dimension measuring device without repeating said calibration prior to use.

23. A method of determining the size of a dimension of an object, the method comprising the steps of:

placing the object at a measurement location associated with a dimension measuring device comprising a line of signal receptors;

actuating a signal source;

obtaining a measurement set of receptor outputs;

accessing stored calibration sets of receptor outputs, wherein each calibration set of receptor outputs is associated with a particular dimension size;

selecting a calibration set of receptor outputs that is closest to the measurement set of receptor outputs;

using the particular dimension size associated with said closest calibration set of receptor outputs, determining the size of a dimension of an object.

24. A method as claimed in claimed in claim 23, wherein the accessing step comprises the step of accessing stored calibration sets of receptor outputs obtained according to the following method:

selecting a group of N adjacent receptors;

positioning at least one calibration object at each of a plurality of positions within an effect area of said N adjacent receptors to simulate measured objects having edges at each of said positions;

actuating a signal source when a calibration object is placed at each position;

reading a calibration set of receptor outputs for each of said positions.

25. A method as claimed in claim 24, wherein step of selecting a calibration set of receptor outputs that is closest to the measurement set of receptor outputs comprises the steps of (i) for each group of N adjacent receptors, attempting to match the measurement set of receptor responses to a calibration set of receptor responses associated with said group of N adjacent receptors, and (ii) finding said closest calibration set of receptor responses and identifying the group of N adjacent receptors with which the closest calibration set of receptor responses is associated.

26. A method as claimed in claim 25, wherein the consecutive groups of N adjacent receptors are non-overlapping.

27. A method as claimed in claim 25, wherein the wherein the consecutive groups of N adjacent receptors are overlapping.

28. A method as claimed in claim 23, wherein N comprises an integer greater than 1.

29. A method of calibrating a dimension measuring device that comprises a line of signal receptors, the method comprising:

selecting a group of N adjacent receptors;

positioning at least one calibration object at each of a plurality of positions within an effect area of said N adjacent receptors to simulate measured objects having edges at each of said positions;

actuating a signal source when a calibration object is placed at each position;

reading a calibration set of receptor outputs for each of said positions, wherein at least one output in the calibration set of receptor outputs is higher than a minimum of a corresponding receptor and a lower than a maximum of the corresponding receptor; and storing said calibration sets of outputs for use during object measurement.

30. A method as claimed in claim 29, wherein N equals 3.

31. A method as claimed in claim 29, wherein the storing step comprises the step of storing said storing said calibration sets of outputs in the memory of a central processor.

32. A method as claimed in claim 29, wherein the reading step comprises reading a calibration set of receptor outputs wherein the receptor outputs are adjusted to standardize the outputs across all receptors.

* * * * *

UNITED STATES PATENT AND TRADEMARK OFFICE

CERTIFICATE OF CORRECTION

PATENT NO. : RE44,238 E
APPLICATION NO. : 13/374734
DATED : May 28, 2013
INVENTOR(S) : Richard H. Cooper et al.

It is certified that error appears in the above-identified patent and that said Letters Patent is hereby corrected as shown below:

In the claims

Column 17, Line 27, delete “23” and insert --24--

Signed and Sealed this
Twenty-third Day of December, 2014

Michelle K. Lee

Michelle K. Lee
*Deputy Director of the United States Patent and Trademark Office*